US011976495B2

(12) United States Patent
Kim

(10) Patent No.: US 11,976,495 B2
(45) Date of Patent: May 7, 2024

(54) TUBULAR-TYPE DEADBOLT DOOR LOCK WITH EDGE BOLT FOR DETECTING DOOR LOCK STATUS

(71) Applicant: RAONARK, Seoul (KR)

(72) Inventor: Jung Suk Kim, Seoul (KR)

(73) Assignee: RAONARK, Seoul (KR)

( * ) Notice: Subject to any disclaimer, the term of this patent is extended or adjusted under 35 U.S.C. 154(b) by 154 days.

(21) Appl. No.: 17/894,517

(22) Filed: Aug. 24, 2022

(65) Prior Publication Data

US 2024/0068273 A1 Feb. 29, 2024

(51) Int. Cl.
*E05B 47/00* (2006.01)
*E05B 63/00* (2006.01)

(52) U.S. Cl.
CPC .......... *E05B 47/00* (2013.01); *E05B 63/0017* (2013.01); *E05B 2047/0069* (2013.01)

(58) Field of Classification Search
CPC ................. E05B 47/00; E05B 63/0017; E05B 2047/0069
See application file for complete search history.

(56) References Cited

U.S. PATENT DOCUMENTS 3,112,944 A * 12/1963 Adler .................... E05B 55/005 292/1.5
3,933,380 A * 1/1976 Wellekens .............. E05B 55/12 292/169.13
4,739,638 A * 4/1988 Lin ......................... E05B 65/06 292/74
5,044,182 A * 9/1991 Totten ................... E05B 63/202 292/169.14
5,918,916 A * 7/1999 Kajuch ................. E05B 63/202 292/169.14
6,928,844 B2 * 8/2005 Chiang ................... E05B 59/00 292/1.5
11,066,858 B1 * 7/2021 Motahari Asl .......... E05B 85/24
11,459,796 B2 * 10/2022 Schmück ................ E05B 63/08
2012/0073338 A1 * 3/2012 Mohla ................. E05B 47/0012 70/124
2014/0361552 A1 * 12/2014 Hartford ................... E05C 1/02 292/163
2018/0155959 A1 * 6/2018 Hartung .................. E05B 17/10
2021/0131144 A1 * 5/2021 Miller ................. E05B 17/2026

* cited by examiner

*Primary Examiner* — Mark A Williams
(74) *Attorney, Agent, or Firm* — STIP Law Group, LLC

(57) ABSTRACT

A tubular-type deadbolt door lock with an edge bolt for detecting a door lock status is disclosed. To this end, the present disclosure includes: a deadbolt guide case having a predetermined length and having a space therein; a deadbolt case installed at a front portion in the deadbolt guide case and having a predetermined space therein; a tubular deadbolt case coupled to surround an outer circumferential surface of a front portion of the deadbolt case; an edge bolt positioned in the tubular deadbolt case, positioned under the deadbolt case, having a pair of rods at an end, and having spring wound on the rods, respectively; a base fitted on a lower portion of the tubular deadbolt case, and a sensor positioned over the base and sensing movement of edge bolt.

6 Claims, 15 Drawing Sheets

TUBULAR-TYPE DEADBOLT DOOR LOCK WITH EDGE BOLT FOR DETECTING DOOR LOCK STATUS

BACKGROUND

(a) Technical Field

The present disclosure relates to a tubular-type deadbolt door lock with an edge bolt for detecting a door lock status.

(b) Background Art

In general, a door lock is installed on a door to prevent unauthorized entry of outsiders and common mechanical tubular-type door locks are usually used to minimize damage to doors in western countries.

Conventional mechanical tubular-type door locks have inconvenience that when implementing a locking function, since a user has to lock or unlock a door by inserting a key in person and manually rotating a lever shaft, when a user loses a key, it is impossible to perform locking or unlocking.

Further, even in the case in which a mechanical tubular-type door lock is implemented into a digital type to be able to perform an automatic locking function, the method that is used to implement such an automatic locking function locks a door by moving a deadbolt to a locking position using a driving unit regardless of whether a door is open or closed when a predetermined time passes. Accordingly, when the automatic locking function is implemented with a door open, a user has to change the deadbolt back to the unlocking positions and then close the door, so there is a problem that inconvenience is caused to users.

Meanwhile, in addition, since tubular-type deadbolt door locks of the related art do not have a structure that can sense a door status, it is unavoidably required to install a sensor that can sense a door status at a body inside a door and a door frame or it is required to automatically move a deadbolt to a locking position when a predetermined time passes.

This case causes a troublesome of installation of a separate sensor and involves vulnerability in security due to the act of moving a deadbolt to a locking position after a predetermined time.

Accordingly, an objective of the present disclosure is to provide a structure that can maximize security by immediately checking opening or closing of a door and operating a deadbolt by configuring an edge bolt, which can sense a door status, in an integrated type in order to make up for this defect.

SUMMARY OF THE DISCLOSURE

An objective of the present disclosure is to provide a structure that can maximize security by immediately checking opening or closing of a door and operating a deadbolt by configuring an edge bolt, which can sense a door status, in an integrated type.

A tubular-type deadbolt door lock with an edge bolt for detecting a door lock status is disclosed.

To this end, the present disclosure includes: a deadbolt guide case having a predetermined length and having a space therein; a deadbolt case installed at a front portion in the deadbolt guide case and having a predetermined space therein; a tubular deadbolt case coupled to surround an outer circumferential surface of a front portion of the deadbolt case; an edge bolt positioned in the tubular deadbolt case, positioned under the deadbolt case, having a pair of rods at an end, and having spring wound on the rods, respectively; a base fitted on a lower portion of the tubular deadbolt case, and a sensor positioned over the base and sensing movement of edge bolt.

An edge bolt guide is installed behind the edge bolt and guides the movement of the edge bolt.

The edge bolt has a horizontal plate having a predetermined area and horizontal protrusions formed on both sides of the horizontal plate, a pair of rods is installed at an end of the horizontal plate, and a vertical bar having a predetermined length is vertically formed at another end of the horizontal plate.

The edge bolt guide has a vertical plate having a predetermined area and a pair of rails extending from the vertical plate, and horizontal grooves that have a predetermined length and in which the horizontal protrusions can be moved are formed on inner surfaces of the rails.

When the sensor senses a closing status of a door by sensing movement of the edge bolt, a deadbolt is operated by a power module separately connected, so a closed status of the door is made.

A face plate is installed at the front of the tubular deadbolt case and a movement groove in which the vertical bar can be moved is formed with a predetermined length on the face plate.

According to the present disclosure having the configuration described above, the troublesome that a separate device should be configured for a tubular-type deadbolt door lock of the related art to sense a door status (opened/closed), and vulnerability in security, are improved, and easiness of installation is provided.

DETAILED DESCRIPTION

Hereafter, a preferred embodiment of a tubular-type deadbolt door lock with an edge bolt for detecting a door lock status that is the present disclosure is described with reference to the accompanying drawings.

Figure 1:
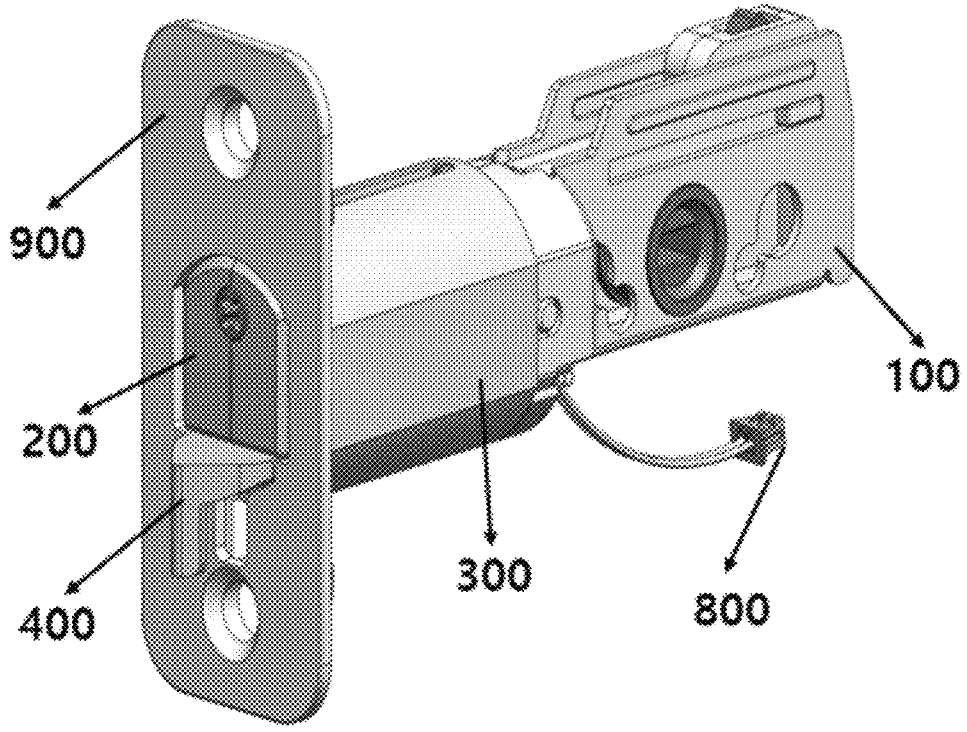
FIG. 1 is an entire configuration view of the present disclosure.
Figure 2:
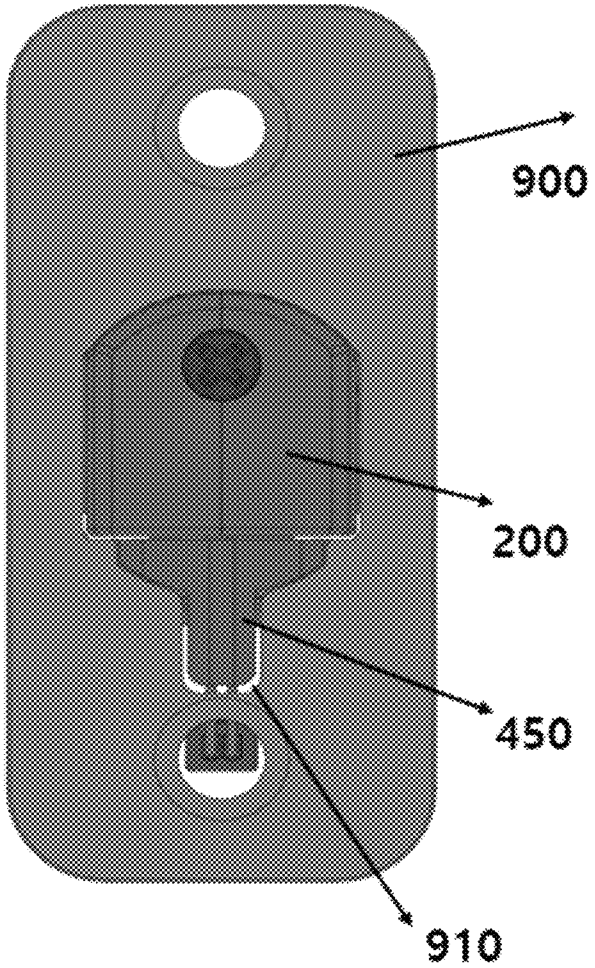
FIG. 2 is a view showing the present disclosure from another side.

FIG. 1 is an entire configuration view of the present disclosure and FIG. 2 is a view showing the present disclosure from another side.

Figure 3:
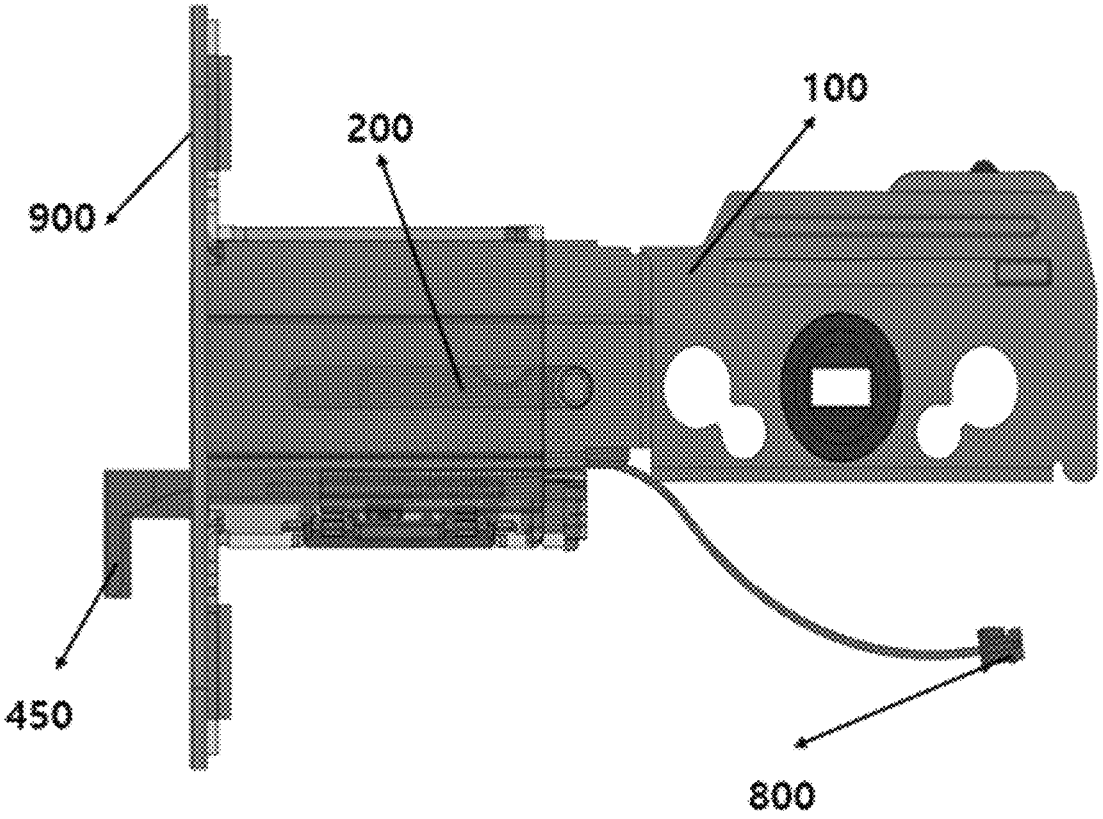
FIG. 3 is a side view of the present disclosure.
Figure 4:
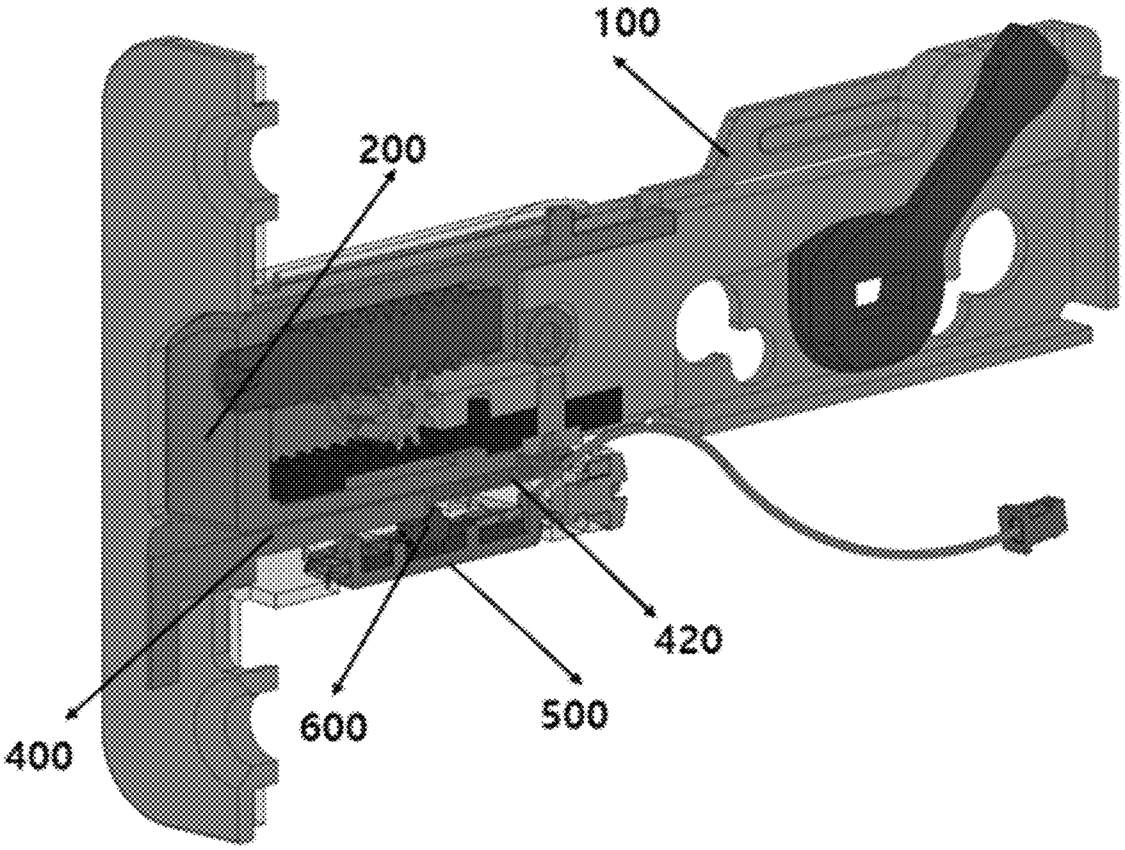
FIG. 4 is an internal perspective view of the present disclosure.

FIG. 3 is a side view of the present disclosure and FIG. 4 is an internal perspective view of the present disclosure.

Figure 5:
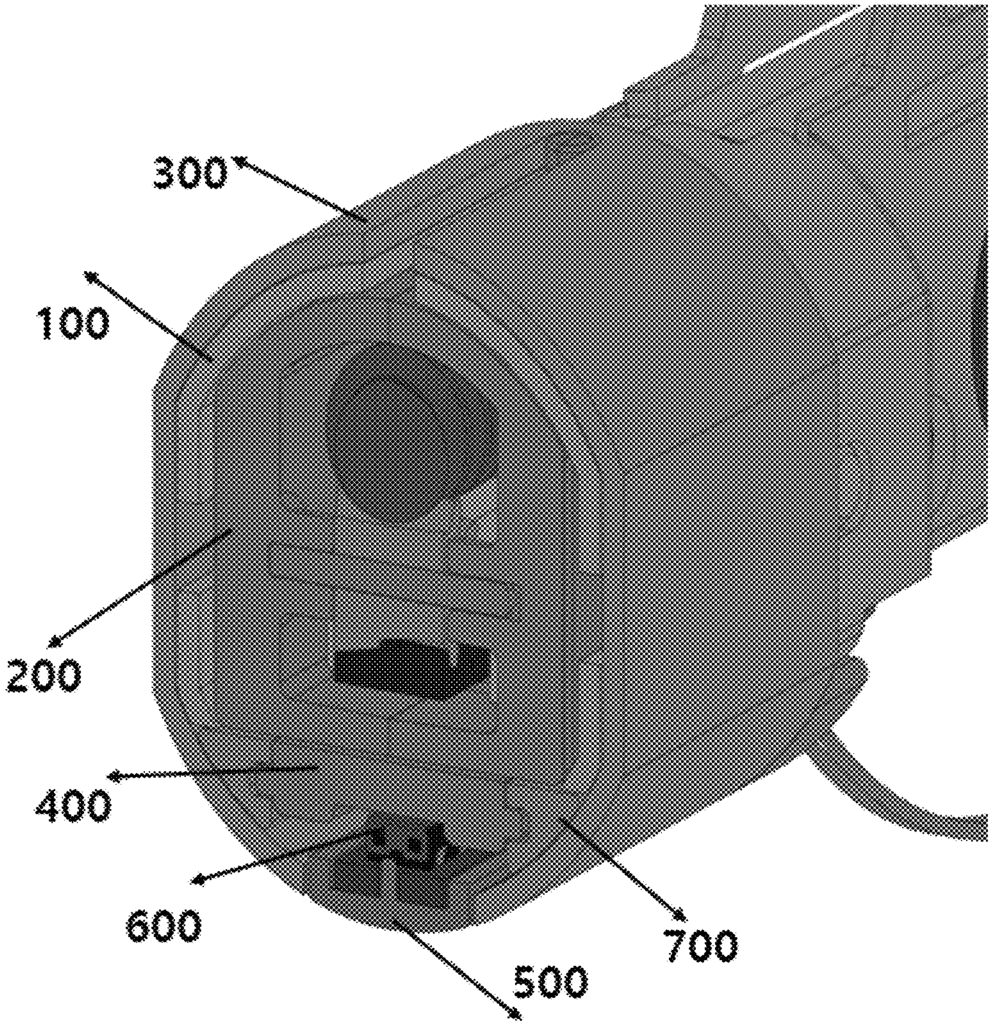
FIG. 5 is an internal perspective view seen from another side of the present disclosure.
Figure 6:
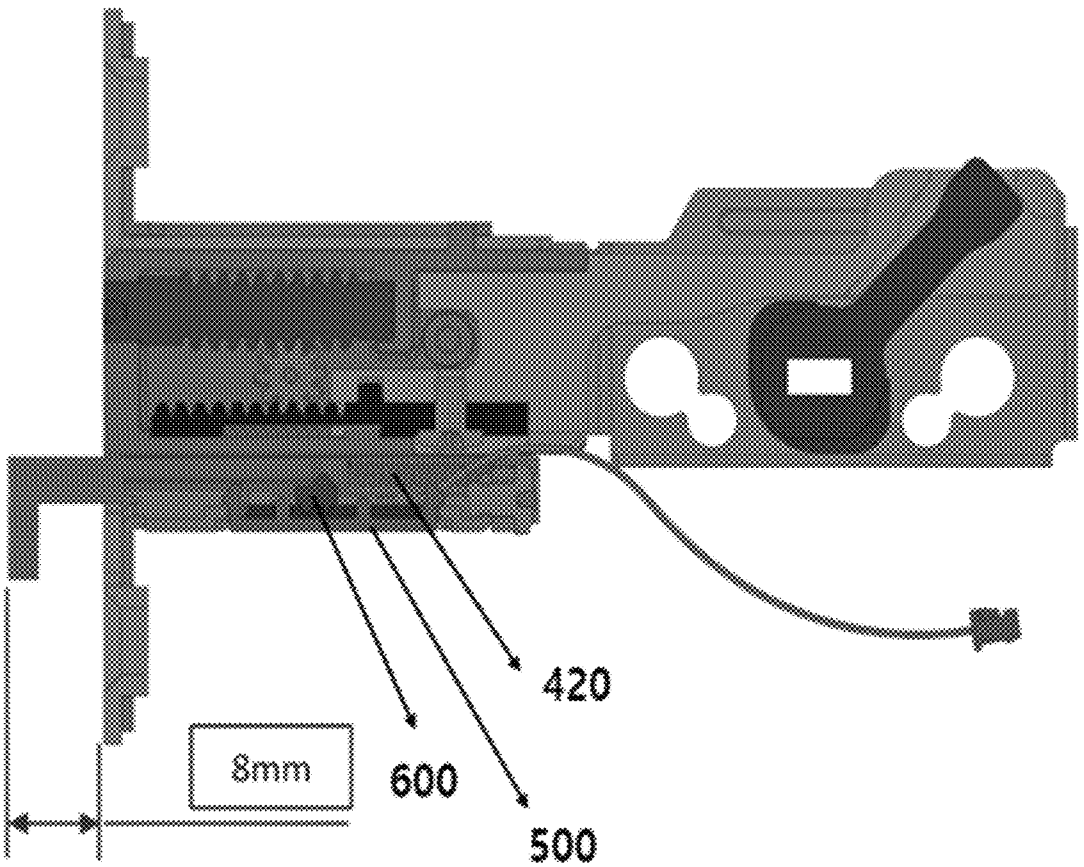
FIGS. 6 and 7 are status views before operation of the present disclosure.
Figure 7:
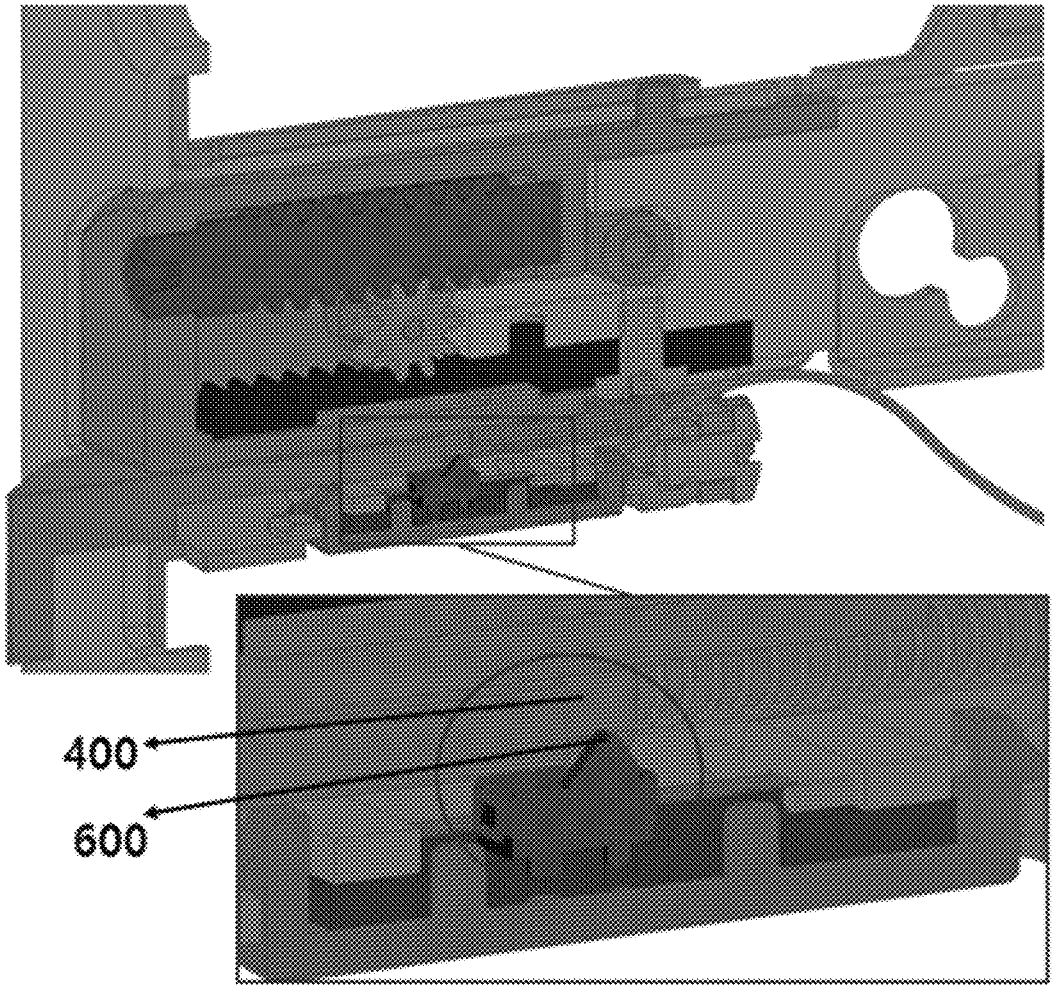
Figure 8:
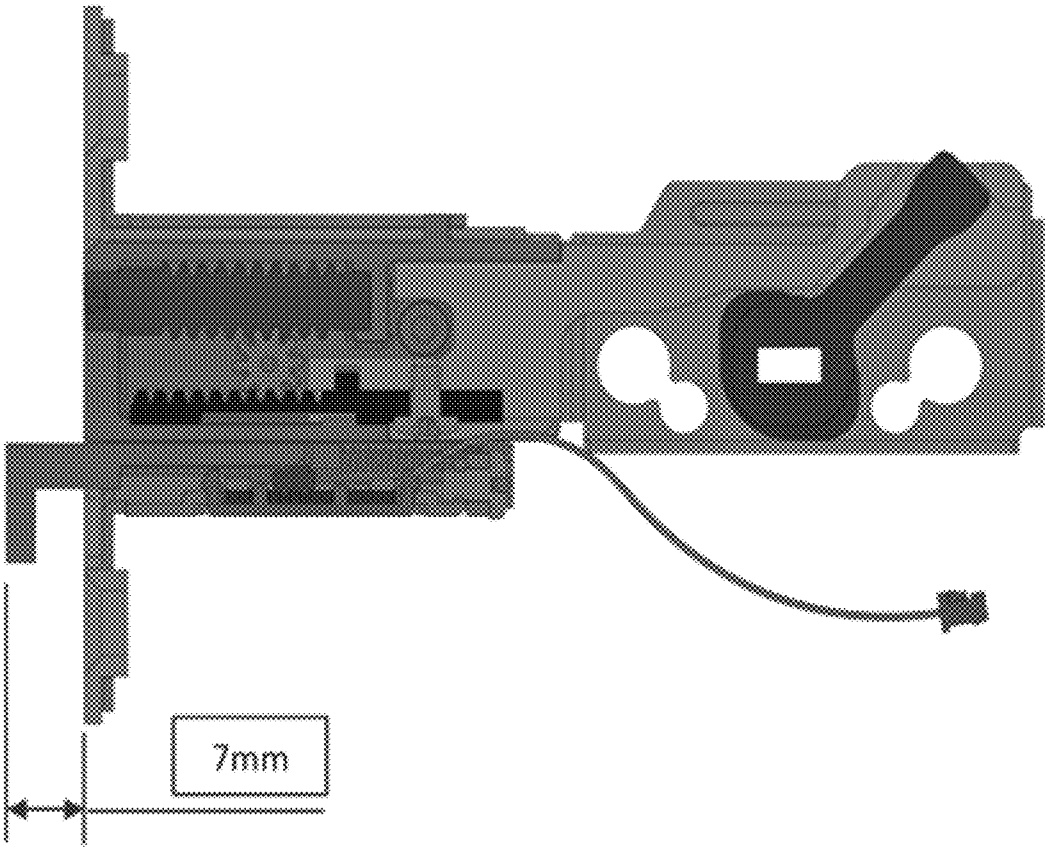
FIGS. 8 and 9 are status views after operation of the present disclosure.
Figure 9:
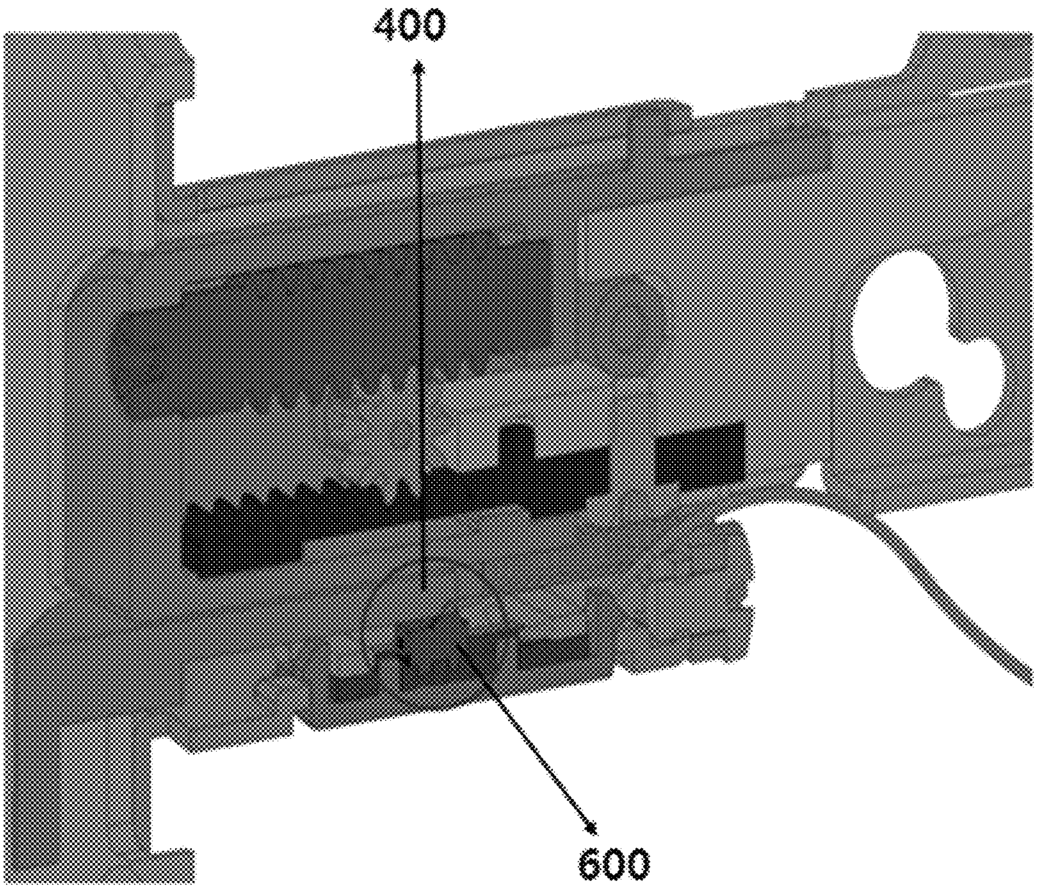

FIG. 5 is an internal perspective view seen from another side of the present disclosure and FIGS. 6 and 7 are status views before operation of the present disclosure, and FIGS. 8 and 9 are status views after operation of the present disclosure.

Figure 10:
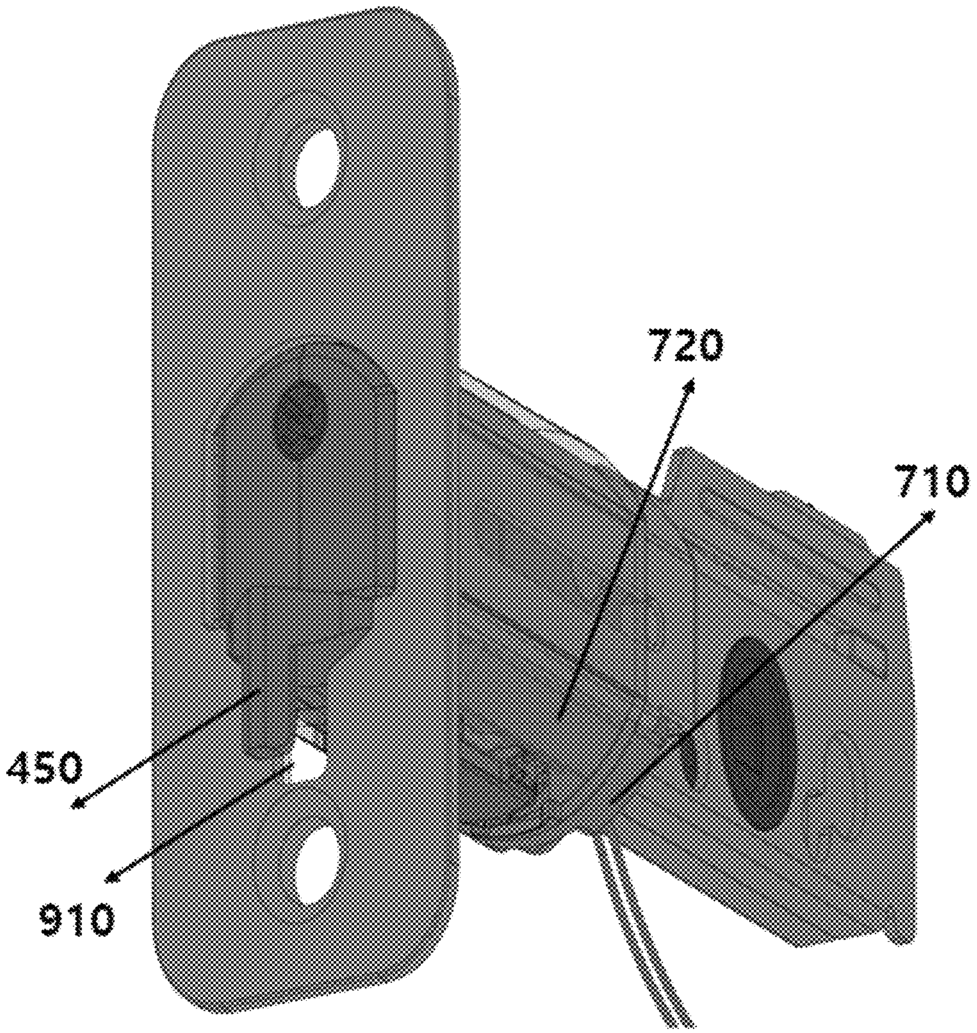
FIGS. 10 to 11 are views of the present disclosure seen from below.
Figure 11:
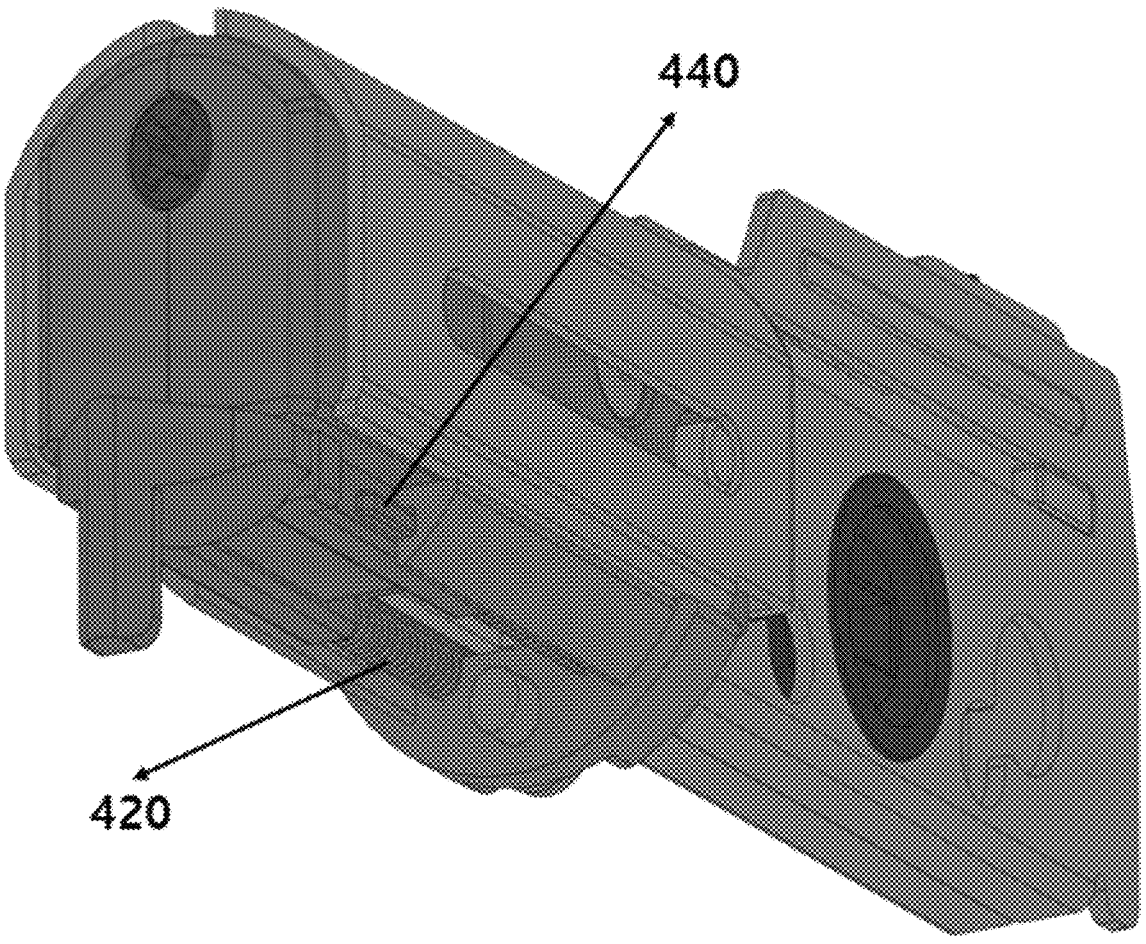

FIGS. 10 to 11 are views of the present disclosure seen from below.

Figure 12:
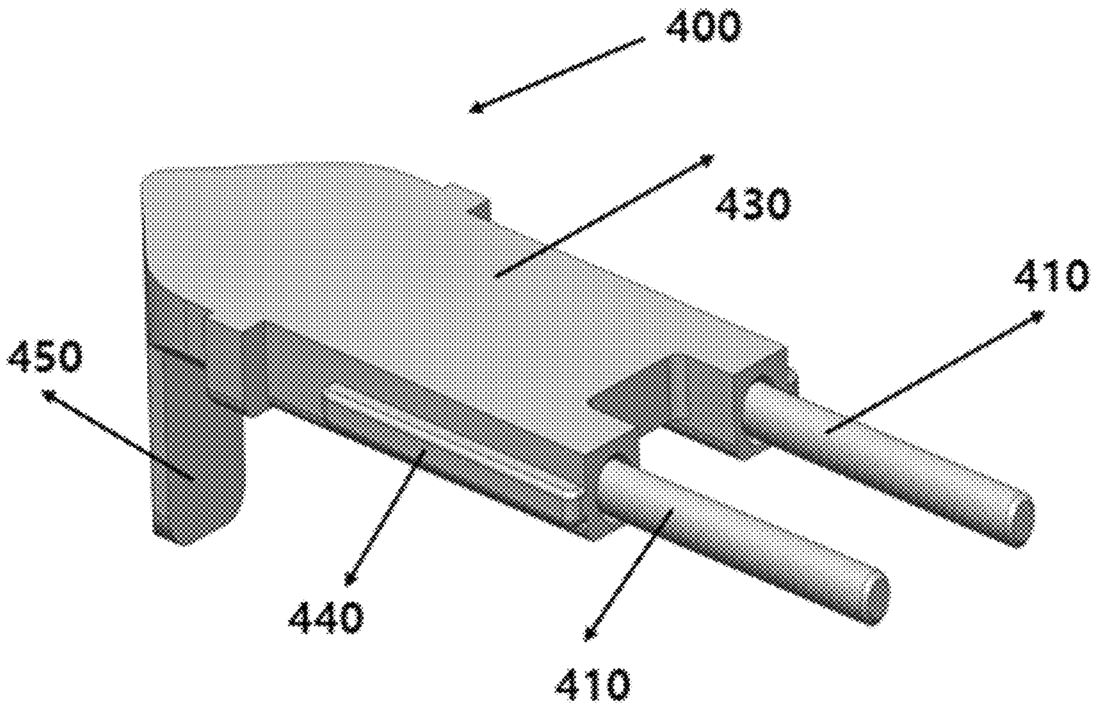
FIG. 12 is a perspective view of an edge bolt that is a component of the present disclosure and FIG. 13 is a perspective view of an edge bolt guide that is a component of the present disclosure.
Figure 13:
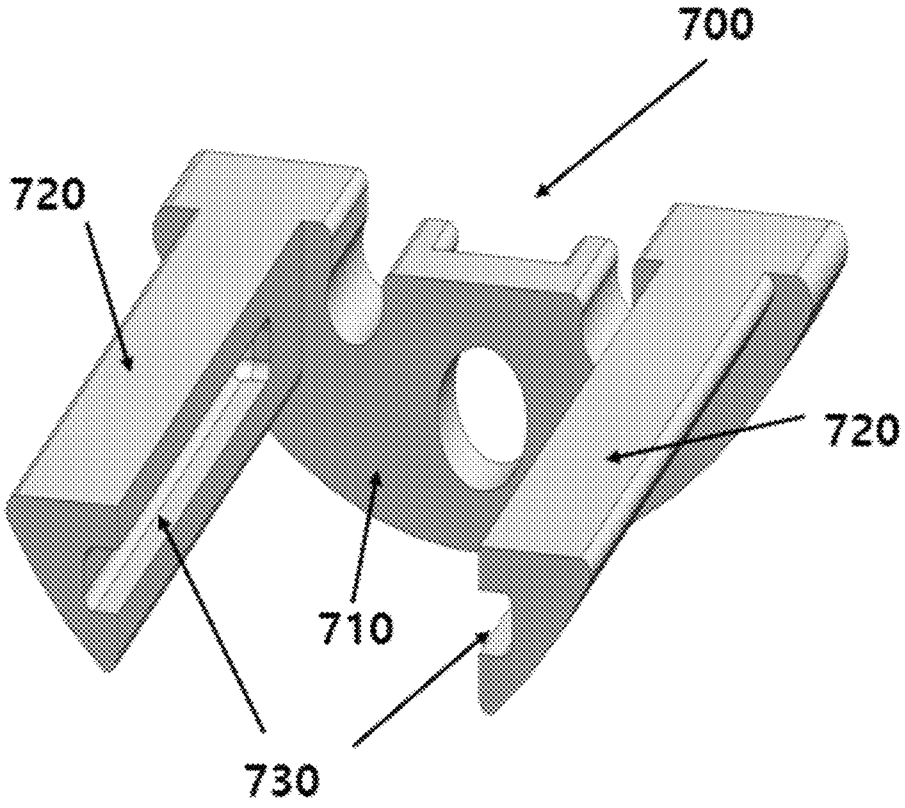

FIG. 12 is a perspective view of an edge bolt that is a component of the present disclosure and FIG. 13 is a perspective view of an edge bolt guide that is a component of the present disclosure.

Figure 14:
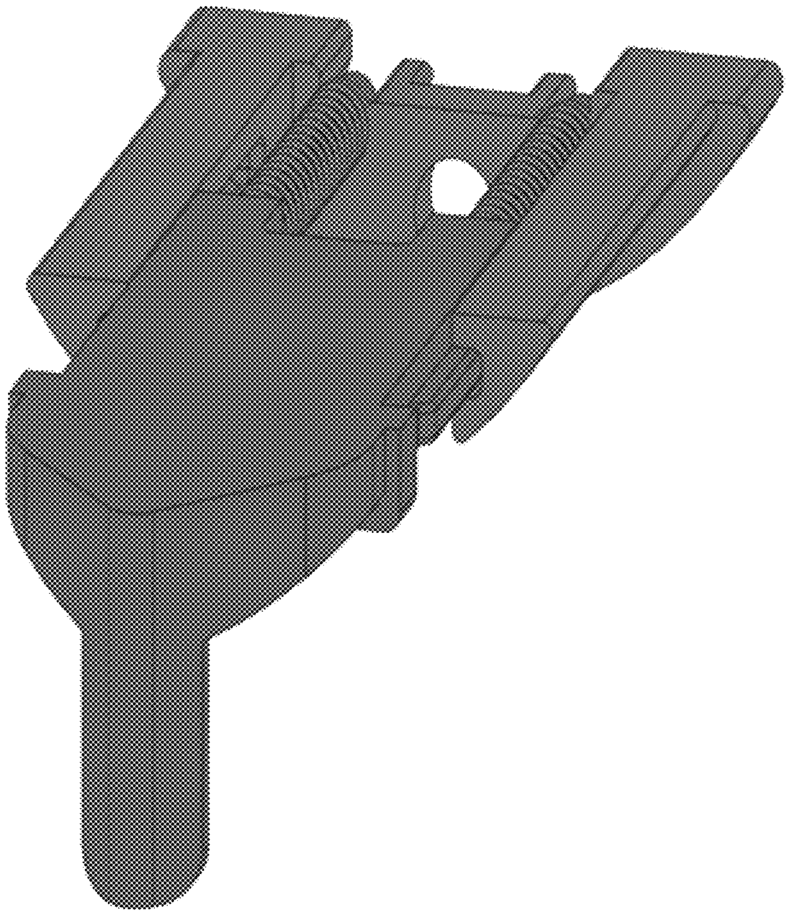
FIG. 14 is a perspective view in which an edge bolt and an edge bolt guide are fastened.

FIG. 14 is a perspective view in which an edge bolt and an edge bolt guide are fastened.

Figure 15:
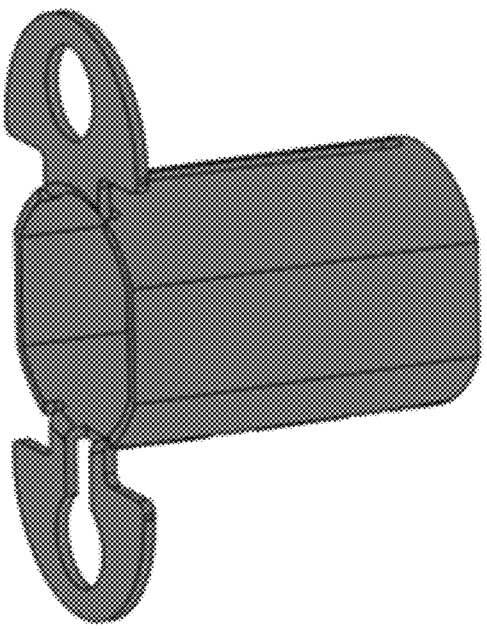
FIG. 15 is a perspective view of a tubular deadbolt case.

FIG. 15 is a perspective view of a tubular dead bolt case.

FIG. 1 is an entire configuration view of the present disclosure, FIG. 2 is a view showing the present disclosure from another side, FIG. 3 is a side view of the present disclosure, and FIG. 4 is an internal perspective view of the present disclosure.

As shown in the figures, the present disclosure discloses a deadbolt guide case 100 having a predetermined length and having a space therein.

The deadbolt guide case 100 is a kind of main body and has a predetermined space in which a deadbolt case 200 and an edge bolt 400 to be described below can be positioned.

The deadbolt case 200 installed at the front portion in the deadbolt guide case 100 and having a predetermined space therein is disclosed and a tubular deadbolt case 300 coupled to surround the outer circumferential surface of the front portion of the deadbolt case 200 is disclosed.

As shown in FIG. 15, the tubular deadbolt case 300 is formed in a cylindrical shape, and a hole in which the edge bolt 400 to be described below can be move is formed at the lower portion at the front of the tubular deadbolt case 300.

Meanwhile, an edge bolt 400 positioned in the tubular deadbolt case 300, positioned under the deadbolt case 200, having a pair of rods 410 at an end, and having spring 420 wound on the rods 410, respectively, is closed.

As shown in FIG. 12, the edge bolt 400 is characterized in that a horizontal plate 430 having a predetermined area is formed, horizontal protrusions 440 are formed on both sides of the horizontal plate 430, respectively, a pair of rods 410 is installed at an end of the horizontal plate 430, and a vertical bar 450 having a predetermined length is vertically formed at another end thereof.

FIG. 2 shows a status in which the vertical bar 450 is positioned on a face plate 900.

The horizontal protrusion 440 having a predetermined length slides along a horizontal groove 730 formed at an edge bolt guide 700 to be described below.

A pair of rods 410 having a predetermined length is installed at an end of the horizontal plate 430 and springs 420 are coupled to the rods 410 in a wound status.

A force is applied to the edge bolt 400 toward the face plate 900 by the springs 420.

As shown in FIGS. 4 to 9, a base 500 fitted on the lower portion of the tubular deadbolt case 300 and a sensor 600 positioned over the base 500 and sensing the movement of the edge bolt 400 are disclosed.

Though will be described below, when the sensor 600 senses movement of the edge bolt 400 and senses a closed status of a door from movement of the edge bolt 400, the sensor 600 transmits a door-closed status signal to a power module 800 separately connected, and the power module 800 receiving the signal operates a deadbolt, thereby making a door-closed status.

An edge bolt guide 700 is installed behind the edge bolt 400 and guides movement of the edge bolt 400.

A status in which the edge bolt guide 700 is installed disclosed in FIGS. 5, 10, and 11, a perspective view of the edge bolt 400 is disclosed in FIG. 13, and FIG. 14 is a perspective view in which the edge bolt 400 and the edge bolt guide 700 are fastened.

The edge bolt guide 700 is characterized in that a vertical plate 710 having a predetermined area and a pair of rails 720 extending from the vertical plate 710 are formed, and horizontal grooves 730 that have a predetermined length and in which the horizontal protrusions 440 can be moved are formed on the inner surfaces of the rails 720.

Horizontal grooves 730 having a predetermined length are formed on the inner surfaces of the pair of rails 720 extending from the vertical plate 710, and the horizontal protrusions 440 described above slide along the horizontal grooves 730.

That is, the edge bolt 400 is moved along the edge bolt guide 700 by the horizontal grooves 730 and the horizontal protrusions 440.

When the sensor 600 senses a closing status of a door by sensing movement of the edge bolt 400, the deadbolt is operated by the power module 800 separately connected, so the closed status of the door is made.

The sensor 600 senses movement of the edge bolt 400 through a photo sensor or senses movement of the edge bolt 400 while being pressed down by movement of the edge bolt 400.

As shown in FIGS. 6 and 7, the vertical part 450 of the edge bolt 400 protrudes 8 mm from the face plate 900 and the edge bolt 400 is not moved in this status, so the sensor 600 does not senses the edge bolt 400 or is not pressed by the edge bolt 400 in this status.

In this case, when a door is closed, as shown in FIGS. 8 and 9 and the edge bolt 400 moves 1 mm from the initial protrusion amount of 8 mm, the sensor 600 senses that the door is in the closed status by sensing the movement and transmits the signal to the power module 800 separately connected and the deadbolt is operated by the power module 800, thereby making the door-closed status.

Meanwhile, as shown in FIG. 2, the face plate 900 is installed at the front of the tubular deadbolt case 300 and a movement groove 910 in which the vertical bar 450 can be moved is formed with a predetermined length on the face plate 900.

As described above, the present disclosure improves the troublesome that a separate device should be configured for a tubular-type deadbolt door lock of the related art to sense a door status (opened/closed), and vulnerability in security, thereby being able to achieve easy installation.

What is claimed is:

1. A tubular-type deadbolt door lock with an edge bolt for detecting a door lock status, the tubular-type deadbolt door lock comprising:

a deadbolt guide case having a predetermined length and having a space therein;

a deadbolt case installed at a front portion in the deadbolt guide case and having a predetermined space therein;

a tubular deadbolt case coupled to surround an outer circumferential surface of a front portion of the deadbolt case;

an edge bolt positioned in the tubular deadbolt case, the edge bolt positioned under the deadbolt case, the edge bolt having a pair of rods at an end thereof, and the edge bolt having two springs each of said two springs wound on a respective one of the rods the pair of rods; and a base fitted on a lower portion of the tubular deadbolt case, and a sensor positioned over the base and the sensor configured for sensing movement of edge bolt.

2. The tubular-type deadbolt door lock of claim 1, wherein an edge bolt guide is installed behind the edge bolt and guides movement of the edge bolt.

3. The tubular-type deadbolt door lock of claim 2, wherein the edge bolt has a horizontal plate having a predetermined area and horizontal protrusions formed on both sides of the horizontal plate, pair of rods is installed at an end of the horizontal plate, and a vertical bar having a predetermined length is vertically formed at another end of the horizontal plate.

4. The tubular-type deadbolt door lock of claim 3, wherein the edge bolt guide has a vertical plate having a predetermined area and a pair of rails extending from the vertical plate, and horizontal grooves that have a predetermined length and in which the horizontal protrusions can be moved are formed on inner surfaces of the rails.

5. The tubular-type deadbolt door lock of claim 4, wherein when the sensor senses a closing status of a door by sensing movement of the edge bolt, a deadbolt is operated by a power module separately connected, and thus a closed status of the door is made.

6. The tubular-type deadbolt door lock of claim 5, wherein a face plate is installed at the front of the tubular deadbolt case, and a movement groove in which the vertical bar can be moved is formed with a predetermined length on the face plate.

* * * * *